(12) United States Patent
Gamache et al.

(10) Patent No.: US 9,700,093 B2
(45) Date of Patent: Jul. 11, 2017

(54) FIBER OPTIC OPAQUE FACE SHIELD

(71) Applicant: The United States of America, as represented by the Secretary of the Navy, Washington, DC (US)

(72) Inventors: Raymond M. Gamache, Indian Head, MD (US); Leslie Brandon Shaw, Woodbridge, VA (US); Jasbinder S. Sanghera, Ashburn, VA (US)

(73) Assignee: The United State of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/192,029

(22) Filed: Jun. 24, 2016

(65) Prior Publication Data

US 2016/0374423 A1 Dec. 29, 2016

Related U.S. Application Data

(60) Provisional application No. 62/183,760, filed on Jun. 24, 2015.

(51) Int. Cl.
| | |
|---|---|
| *A42B 3/04* | (2006.01) |
| *G02B 6/06* | (2006.01) |
| *G02B 27/01* | (2006.01) |
| *F41H 1/08* | (2006.01) |

(52) U.S. Cl.
CPC ............... *A42B 3/042* (2013.01); *F41H 1/08* (2013.01); *G02B 6/06* (2013.01); *G02B 27/0172* (2013.01)

(58) Field of Classification Search
CPC .. A42B 3/04; A42B 3/042; F41H 1/08; G02B 27/01; G02B 27/0172; G02B 6/06
See application file for complete search history.

(56) References Cited

U.S. PATENT DOCUMENTS

| | | | |
|---|---|---|---|
| 7,542,209 B2* | 6/2009 | McGuire, Jr. ...... | G02B 27/0081 359/630 |
| 2016/0374423 A1* | 12/2016 | Gamache ............... | A42B 3/042 385/116 |

* cited by examiner

*Primary Examiner* — Andrew Jordan
(74) *Attorney, Agent, or Firm* — US Naval Research Laboratory; Rebecca L. Forman

(57) ABSTRACT

A system, method, and helmet includes a collection optic configured to collect light from a scene and create an image; a fiber optic bundle configured to receive the image from the collection optic; an opaque ballistic face shield configured adjacent to the fiber optic bundle; and a projection optic configured to receive the image from the fiber optic bundle and project the image to a viewer. The collection optic includes a field of view (FOV) of greater than 30 degrees, and preferably greater than 50 degrees. The collection optic images the collected light gathered from the scene onto an end of the fiber optic bundle. The fiber optic bundle goes through or around the opaque ballistic face shield. The opaque ballistic face shield is non-electric and includes silicon carbide and polyethylene. In one embodiment, the opaque ballistic face shield includes at least two pounds of silicon carbide and polyethylene.

20 Claims, 5 Drawing Sheets

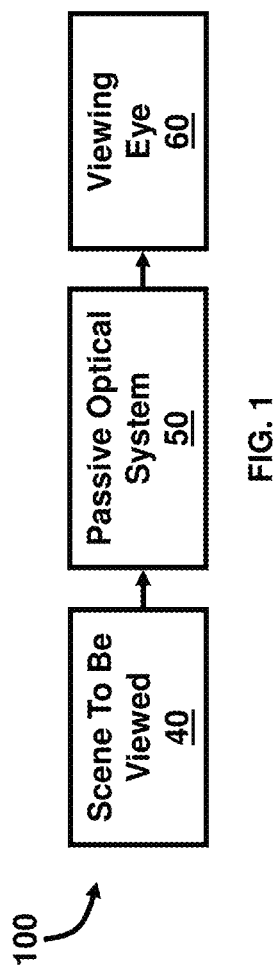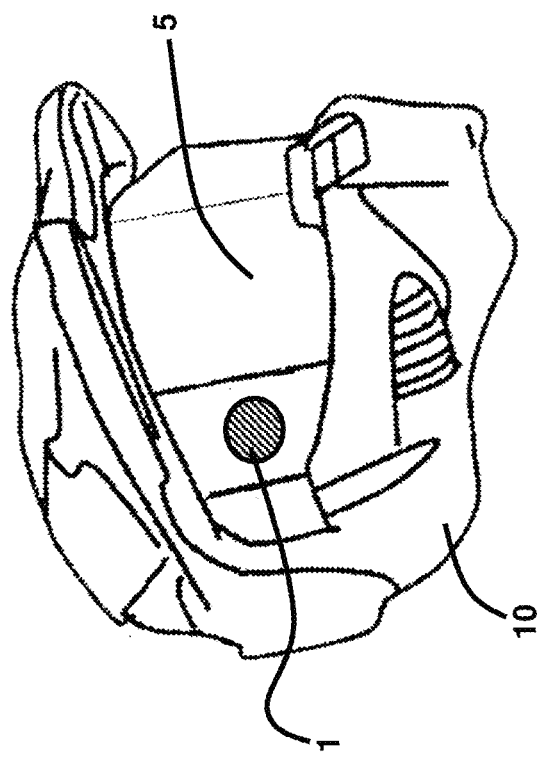

FIBER OPTIC OPAQUE FACE SHIELD

CROSS-REFERENCE TO RELATED APPLICATIONS

This application claims priority to U.S. Provisional Patent Application No. 62/183,760 filed on Jun. 24, 2015, the complete disclosure of which, in its entirety, is herein incorporated by reference.

GOVERNMENT INTEREST

The embodiments described herein may be manufactured, used, and/or licensed by or for the United States Government without the payment of royalties thereon.

BACKGROUND

Technical Field

The embodiments herein generally relate to armor systems, and more particularly to face shields.

Description of the Related Art

Both military and non-military personnel use face shields to protect the user's face and eyes from flying hazards and potentially harmful fluids. Transparent face shields allow the user to have visual acuity while still offering protection. Often, opaque face shields are required to enhance the protection to the user's eyes, particularly when ultraviolet rays are hitting the face shield. Conventional transparent face shields comprise approximately four pounds of borosilicate/polycarbonate glass. Conventional opaque armor systems provide a greater mass efficiency as compared to transparent armor systems. However, conventional opaque face shields typically do not provide suitable optic image transfer to the level of clarity required, particularly in military applications.

SUMMARY

In view of the foregoing, an embodiment herein provides a system comprising a collection optic configured to collect light from a scene and create an image; a fiber optic bundle configured to receive the image from the collection optic; an opaque ballistic face shield configured adjacent to the fiber optic bundle; and a projection optic configured to receive the image from the fiber optic bundle and project the image to a viewer. In one embodiment, the collection optic comprises a field of view (FOV) of greater than 30 degrees. In another embodiment, the collection optic comprises a FOV of greater than 50 degrees. The collection optic images the collected light gathered from the scene onto an end of the fiber optic bundle. In one embodiment, the fiber optic bundle goes through the opaque ballistic face shield. In another embodiment, the fiber optic bundle goes around the opaque ballistic face shield. The opaque ballistic face shield is non-electric. The opaque ballistic face shield comprises silicon carbide and polyethylene. In one embodiment, the opaque ballistic face shield comprises at least two pounds of silicon carbide and polyethylene.

Another embodiment provides a helmet comprising a collection optic configured to collect light from a scene and create an image; a non-electric opaque ballistic face shield adjacent to the collection optic, wherein the opaque ballistic face shield comprises silicon carbide and polyethylene; a fiber optic bundle configured to receive the image from the collection optic; and a projection optic configured to receive the image from the fiber optic bundle and project the image to a viewer. In one embodiment, the collection optic comprises a FOV of greater than 30 degrees. In another embodiment, the collection optic comprises a FOV of greater than 50 degrees. The collection optic images the collected light gathered from the scene onto an end of the fiber optic bundle. In one embodiment, the fiber optic bundle goes through the opaque ballistic face shield. In another embodiment, the fiber optic bundle goes around the opaque ballistic face shield. In one embodiment, the opaque ballistic face shield comprises at least two pounds of silicon carbide and polyethylene.

Another embodiment provides a method for collecting and transferring an image, the method comprising collecting light from a scene and creating an image using a collection optic; receiving the image from the collection optic using a fiber optic bundle; providing an opaque ballistic face shield adjacent to the fiber optic bundle; and receiving the image from the fiber optic bundle and projecting the image to a viewer using a projection optic. The collection optic may comprise a FOV of greater than 30 degrees. The method may further comprise using the collection optic to image the collected light gathered from the scene onto an end of the fiber optic bundle. The opaque ballistic face shield is non-electric and may comprise at least two pounds of silicon carbide and polyethylene, in one embodiment.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is a block diagram of a system for capturing images according to an embodiment herein;

FIG. 2 is a perspective view of a helmet according to an embodiment herein;

DETAILED DESCRIPTION

Figure 3:
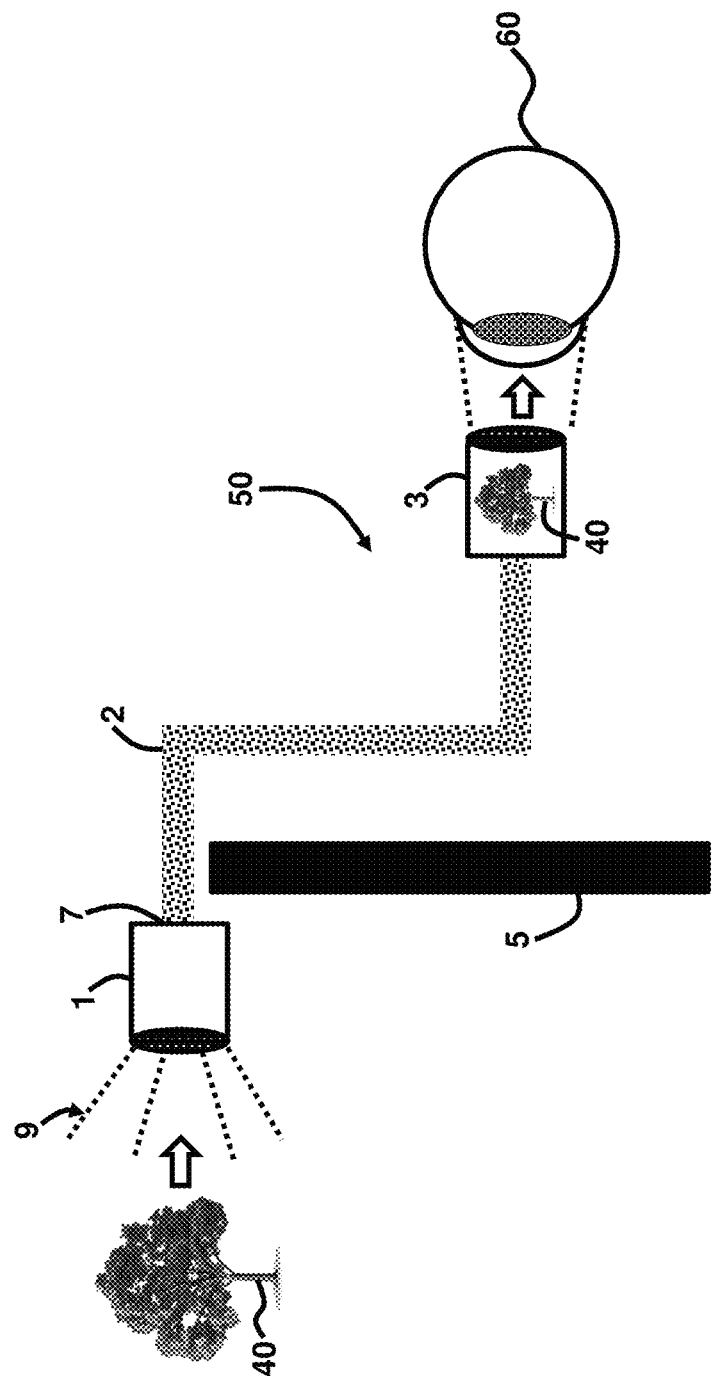
FIG. 3 is a schematic diagram of a passive optical system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

An embodiment herein integrates a passive optical system to enable visibility around an opaque armor face shield with visibility equivalent to incorporating a transparent face shield. The application of optics to enable visibility around an opaque face shield with equivalent field of view (FOV) enables a lighter weight face shield solution. Mass efficiencies of opaque armor systems greatly exceed transparent armor systems. The weight of the face shield can be greatly reduced if an opaque armor system can be incorporated. Through the ability to enable visibility around the opaque armor a much lighter weight face shield system can be realized. Referring now to the drawings, and more particularly to FIGS. 1 through 6, where similar reference characters denote corresponding features consistently throughout the figures, there are shown preferred embodiments.

FIG. 1 illustrates a block diagram of a system 100 for capturing images, wherein the system 100 comprises a scene to be viewed 40 of which an image is captured, a passive optical system 50, and a viewing eye 60 according to an embodiment herein. An image of the scene 40 is captured by the passive optical system 50 and is transferred to the viewing eye 60. FIG. 2, with reference to FIG. 1, illustrates a perspective view of a helmet 10 comprising a collection optic 1 of the passive optical system 50, and an opaque ballistic face shield 5. In one embodiment, the collection optic 1 may be embedded into the opaque ballistic face shield 5. Alternatively, in another embodiment, the collection optic 1 may be positioned adjacent to the opaque ballistic face shield 5.

FIG. 3, with reference to FIGS. 1 and 2, illustrates a passive optical system 50 comprising a collection optic 1, a fiber optic bundle 2, and a projection optic 3. The collection optic 1 collects light from a scene 40. The collection optic 1 comprises a field of view (FOV) of greater than thirty degrees (>30°), and more preferably greater than fifty degrees (>50°), in one embodiment. A fiber optic bundle 2 takes the collected light 9 gathered by the collection optic 1 such that the collection optic 1 images the light 9 gathered from the scene 40 onto the end 7 of the fiber optic bundle 2. The fiber optic bundle 2 goes in/through (e.g., embedded in) or around (e.g., positioned adjacent) the opaque ballistic face shield 5. The fiber optic bundle 2 transfers the image of the scene 40 from the collection optic 1 to the projection optic 3. The projection optic 3 takes the image of the scene 40 transferred by the fiber optic bundle 2 and projects the image to a viewing eye 60.

Figure 4:
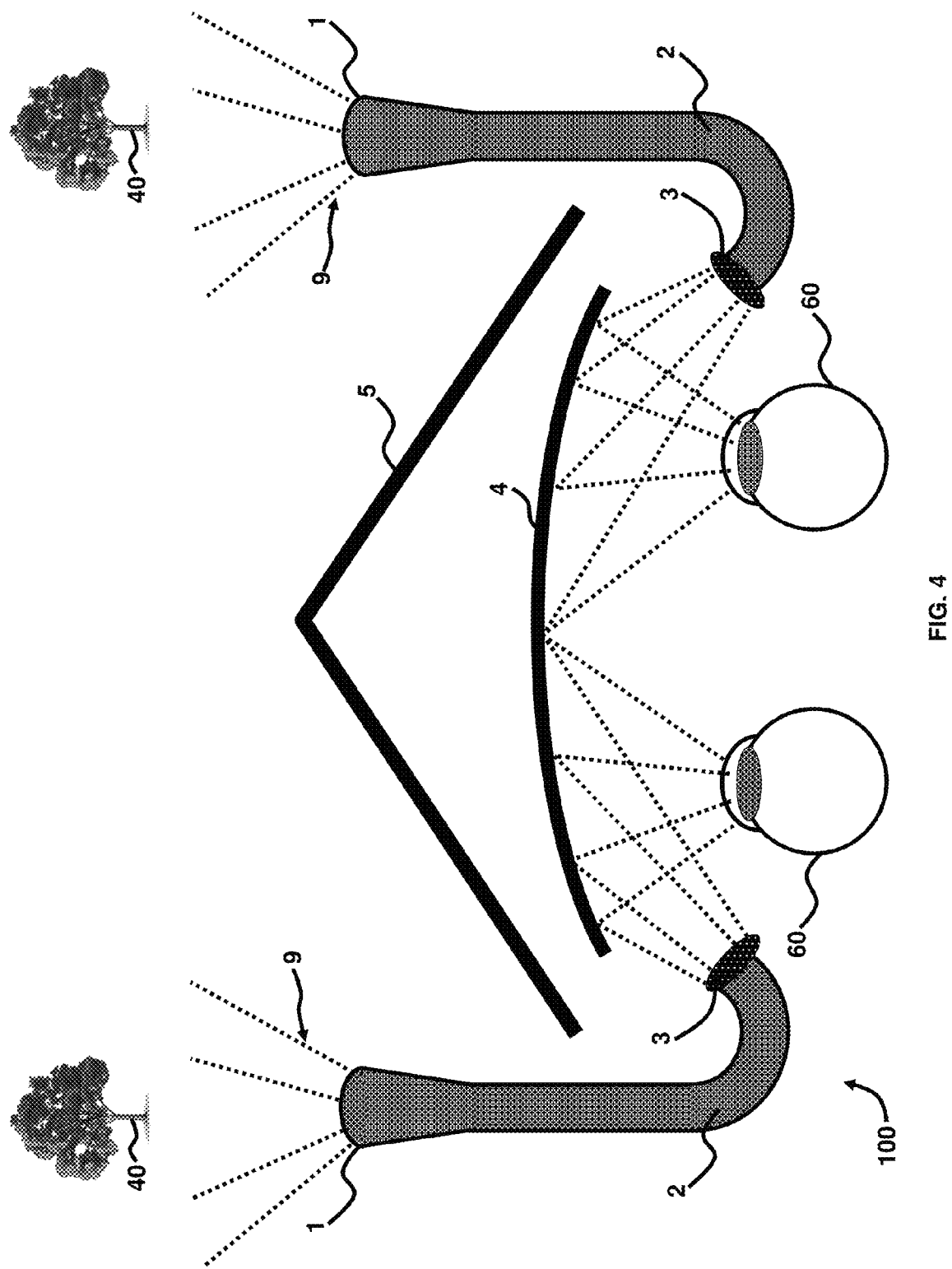
FIG. 4 is a schematic diagram of a system for capturing images according to an embodiment herein.
Figure 5:
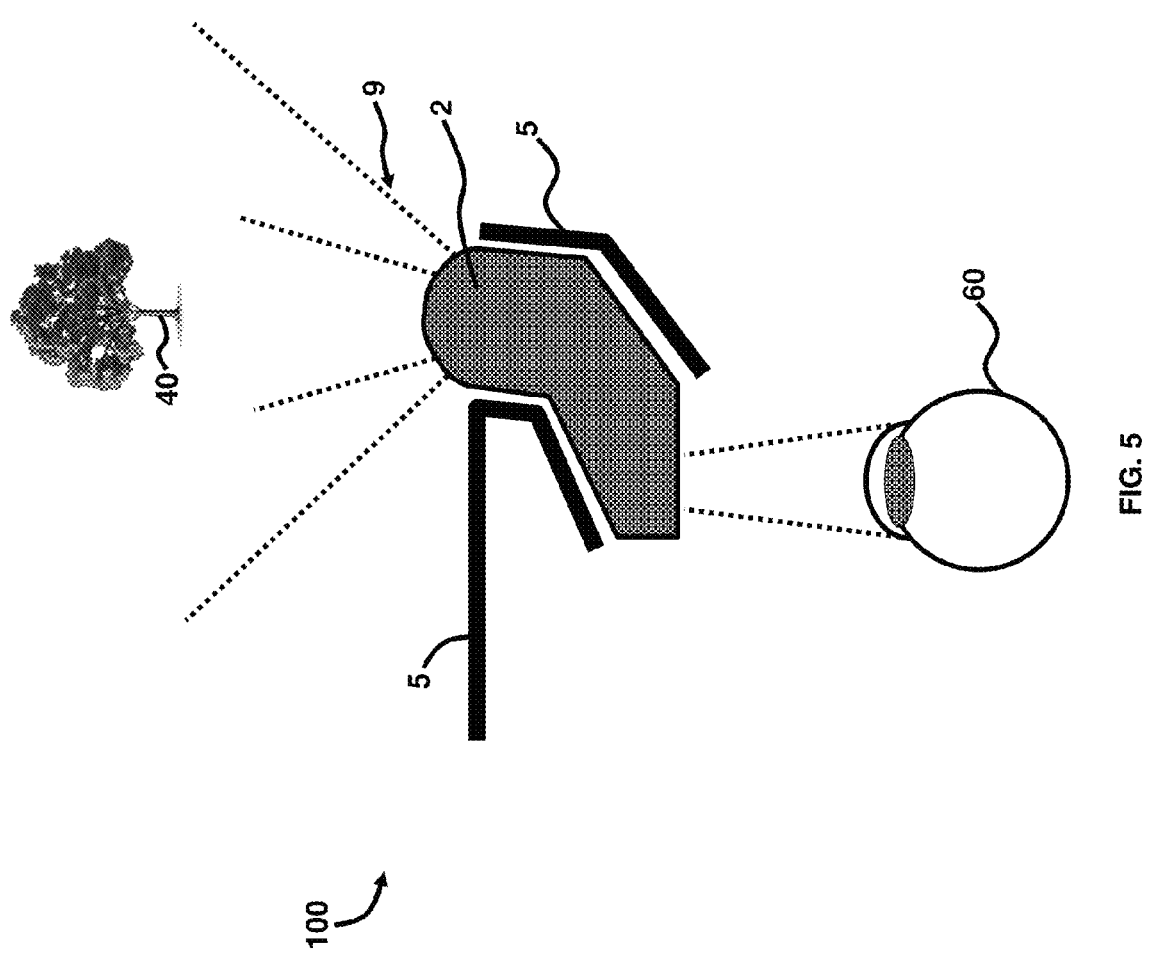
FIG. 5 is a schematic diagram of a system according to another embodiment herein.

FIG. 4, with reference to FIGS. 1 through 3, illustrates another view of the system 100 for capturing images of a scene 40. As shown in FIG. 4, the system 100 is configured to have a pair of fiber optic bundles 2 with each fiber optic bundle 2 positioned on, in, or adjacent to opposite lateral sides of the opaque ballistic face shield 5 and a corresponding reflective view screen 4. Each fiber optic bundle 2 is connected to a collection optic 1, wherein the collection option may be configured as microlens arrays such as those available from RPC Photonics, Inc. (Rochester, N.Y., USA). The projection optic 3 may be configured as compact lenses such as those available from Century/Schneider Optics (North Hollywood, Calif., USA). The fiber optic bundle 2 may be configured as glass or plastic fiber optic bundles such as those available from Schott North America (Elmsford, N.Y., USA). FIG. 5, with reference to FIGS. 1 through 4, illustrates another view of the system 100 for capturing images of a scene 40, wherein the system 100 comprises a fiber optic bundle 2 embedded in/through the opaque ballistic face shield 5.

Figure 6:
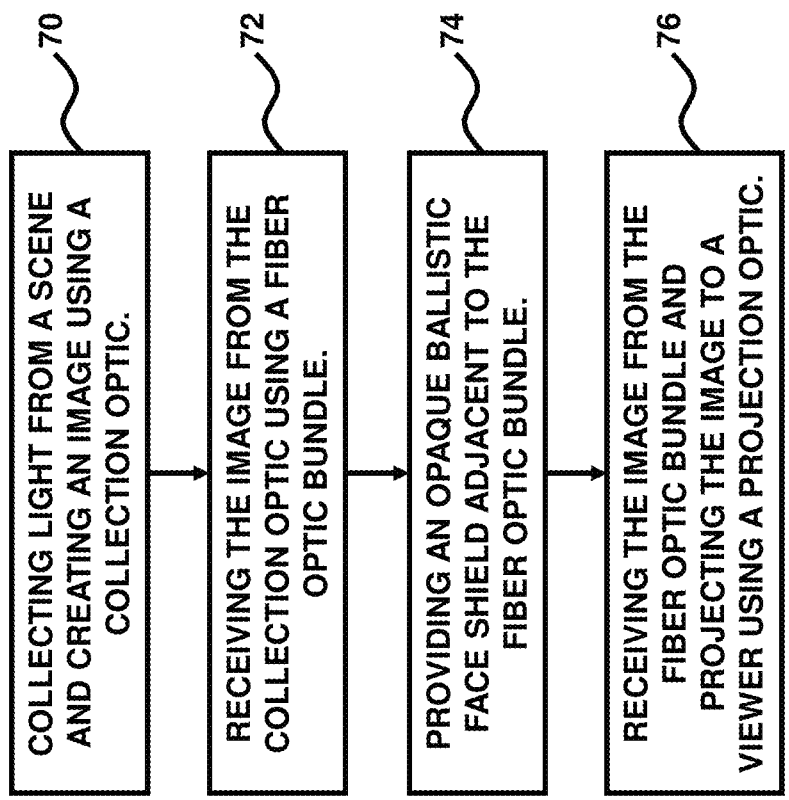
FIG. 6 is a flowchart illustrating a method according to an embodiment herein.

FIG. 6, with reference to FIGS. 1 through 5, illustrates a method for collecting and transferring an image, the method comprising collecting (70) light 9 from a scene 40 and creating an image using a collection optic 1; receiving (72) the image from the collection optic 1 using a fiber optic bundle 2; providing (74) an opaque ballistic face shield 5 adjacent to the fiber optic bundle 2; and receiving (76) the image from the fiber optic bundle 2 and projecting the image to a viewer 60 using a projection optic 3. The method may further comprise using the collection optic 1 to image the collected light 9 gathered from the scene 40 onto an end 7 of the fiber optic bundle 2. In one embodiment, the collection optic 1 comprises a FOV of greater than 30 degrees. In another embodiment, the collection optic 1 comprises a FOV of greater than 50 degrees. The opaque ballistic face shield 5 is non-electric. The opaque ballistic face shield 5 comprises silicon carbide and polyethylene. In one embodiment, the opaque ballistic face shield 5 comprises at least two pounds of silicon carbide and polyethylene.

The embodiments herein incorporate a passive optical system 50 to enable visibility around an opaque armor face shield 5. The embodiments herein provide total ballistic protection to a soldier head without obstructing vision. Moreover, the opaque face shield 5 is a passive system; e.g., no electric power is needed for operation.

There are several inherent technical challenges in developing suitable opaque face shield systems including (1) maintaining an effective visual resolution for the user's eyes (e.g., low resolution vs. high resolution), (2) maintaining a suitable field of view (FOV) for the user (e.g., low FOV vs. high FOV), (3) maximizing image throughput (e.g., low image transmission vs. high image transmission), (4) enabling wide depth of field (DOF) for the user (e.g., shallow DOF vs. deep DOF), and (5) projecting a homogenous image to the user's eyes (e.g., low homogeneity vs. high homogeneity).

The embodiments herein provide optimal resolution (e.g., high resolution), FOV (e.g., high FOV), throughput (e.g., high transmission), DOF (e.g., deep DOF), and homogeneity (e.g., high homogeneity). Moreover, the embodiments herein provide an opaque face shield 5 having minimal weight and size and may be constructed using off the shelf commercial components. The optical system 100 is capable of National Institute of Justice (NIJ) level IV protection, and enables near, far, and medium field imaging.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system comprising:
   a collection optic configured to collect light from a scene and create an image;

a fiber optic bundle configured to receive said image from said collection optic;
an opaque ballistic face shield configured adjacent to said fiber optic bundle; and
a projection optic configured to receive said image from said fiber optic bundle and project said image to a viewer.

2. The system of claim 1, wherein said collection optic comprises a field of view (FOV) of greater than 30 degrees.

3. The system of claim 1, wherein said collection optic comprises a field of view (FOV) of greater than 50 degrees.

4. The system of claim 1, wherein said collection optic images said collected light gathered from said scene onto an end of said fiber optic bundle.

5. The system of claim 1, wherein said fiber optic bundle goes through said opaque ballistic face shield.

6. The system of claim 1, wherein said fiber optic bundle goes around said opaque ballistic face shield.

7. The system of claim 1, wherein said opaque ballistic face shield is non-electric.

8. The system of claim 1, wherein said opaque ballistic face shield comprises silicon carbide and polyethylene.

9. The system of claim 1, wherein said opaque ballistic face shield comprises at least two pounds of silicon carbide and polyethylene.

10. A helmet comprising:
a collection optic configured to collect light from a scene and create an image;
a non-electric opaque ballistic face shield adjacent to said collection optic, wherein said opaque ballistic face shield comprises silicon carbide and polyethylene;
a fiber optic bundle configured to receive said image from said collection optic; and
a projection optic configured to receive said image from said fiber optic bundle and project said image to a viewer.

11. The helmet of claim 10, wherein said collection optic comprises a field of view (FOV) of greater than 30 degrees.

12. The helmet of claim 10, wherein said collection optic comprises a field of view (FOV) of greater than 50 degrees.

13. The helmet of claim 10, wherein said collection optic images said collected light gathered from said scene onto an end of said fiber optic bundle.

14. The helmet of claim 10, wherein said fiber optic bundle goes through said opaque ballistic face shield.

15. The helmet of claim 10, wherein said fiber optic bundle goes around said opaque ballistic face shield.

16. The helmet of claim 10, wherein said opaque ballistic face shield comprises at least two pounds of silicon carbide and polyethylene.

17. A method for collecting and transferring an image, said method comprising:
collecting light from a scene and creating an image using a collection optic;
receiving said image from said collection optic using a fiber optic bundle;
providing an opaque ballistic face shield adjacent to said fiber optic bundle; and
receiving said image from said fiber optic bundle and projecting said image to a viewer using a projection optic.

18. The method of claim 17, wherein said collection optic comprises a field of view (FOV) of greater than 30 degrees.

19. The method of claim 17, further comprising using said collection optic to image said collected light gathered from said scene onto an end of said fiber optic bundle.

20. The method of claim 17, wherein said opaque ballistic face shield is non-electric and comprises at least two pounds of silicon carbide and polyethylene.

* * * * *